United States Patent
Hirai et al.

(10) Patent No.: US 9,448,590 B2
(45) Date of Patent: Sep. 20, 2016

(54) ELECTRONIC APPARATUS

(71) Applicant: Kabushiki Kaisha Toshiba, Tokyo (JP)

(72) Inventors: Yuichi Hirai, Hamura (JP); Shingo Koide, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 14/330,792

(22) Filed: Jul. 14, 2014

(65) Prior Publication Data

US 2015/0103493 A1    Apr. 16, 2015

Related U.S. Application Data

(60) Provisional application No. 61/891,835, filed on Oct. 16, 2013.

(51) Int. Cl.
G06F 1/16    (2006.01)

(52) U.S. Cl.
CPC ................... G06F 1/1633 (2013.01)

(58) Field of Classification Search
None
See application file for complete search history.

(56) References Cited

U.S. PATENT DOCUMENTS

| 5,808,861 | A * | 9/1998 | Nakajima | B60G 17/052 361/679.27 |
| 2002/0100807 | A1 | 8/2002 | Minaguchi et al. | |
| 2005/0117286 | A1 * | 6/2005 | Karashima | G06F 1/1616 361/679.28 |
| 2008/0043419 | A1 * | 2/2008 | Tatsukami | G06F 1/1616 361/679.33 |
| 2010/0073900 | A1 | 3/2010 | Tachikawa et al. | |
| 2015/0103493 | A1 * | 4/2015 | Hirai | G06F 1/1633 361/728 |

FOREIGN PATENT DOCUMENTS

| JP | 59-10775 | 4/1984 |
| JP | 2002-217754 | 8/2002 |
| JP | 2010-073158 | 4/2010 |

* cited by examiner

*Primary Examiner* — Anthony Q Edwards

(74) *Attorney, Agent, or Firm* — Rutan & Tucker, LLP; William W. Schaal

(57) ABSTRACT

According to one embodiment, an apparatus includes a board, a module, cables, and an insulator. The module includes a module body having a first end portion protruding to form a step and module terminals attached to the first end portion. The first end portion is thinner than a main portion of the module body. The protrusion height of the module terminal is less than that of the step. The cables have cable terminals fixed to the module terminals. The insulator has a first adhesive portion adhered to an adhesive point arranged on the back side to the first surface opposite to the board, a second adhesive portion adhered to the first surface, and a cover portion continued to the second adhesive portion and covering the cable terminal between both adhesive portions.

14 Claims, 13 Drawing Sheets

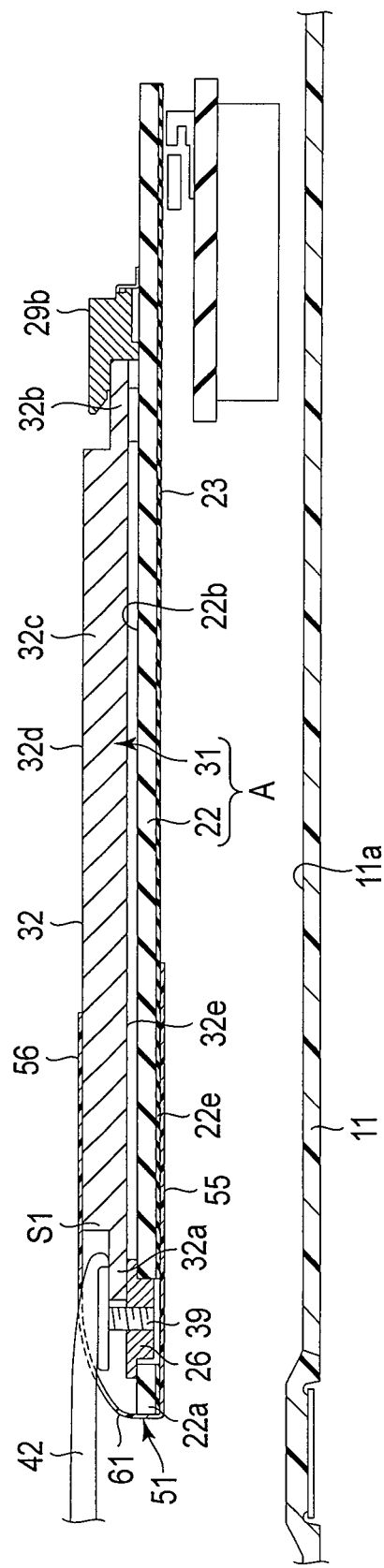
F I G. 5

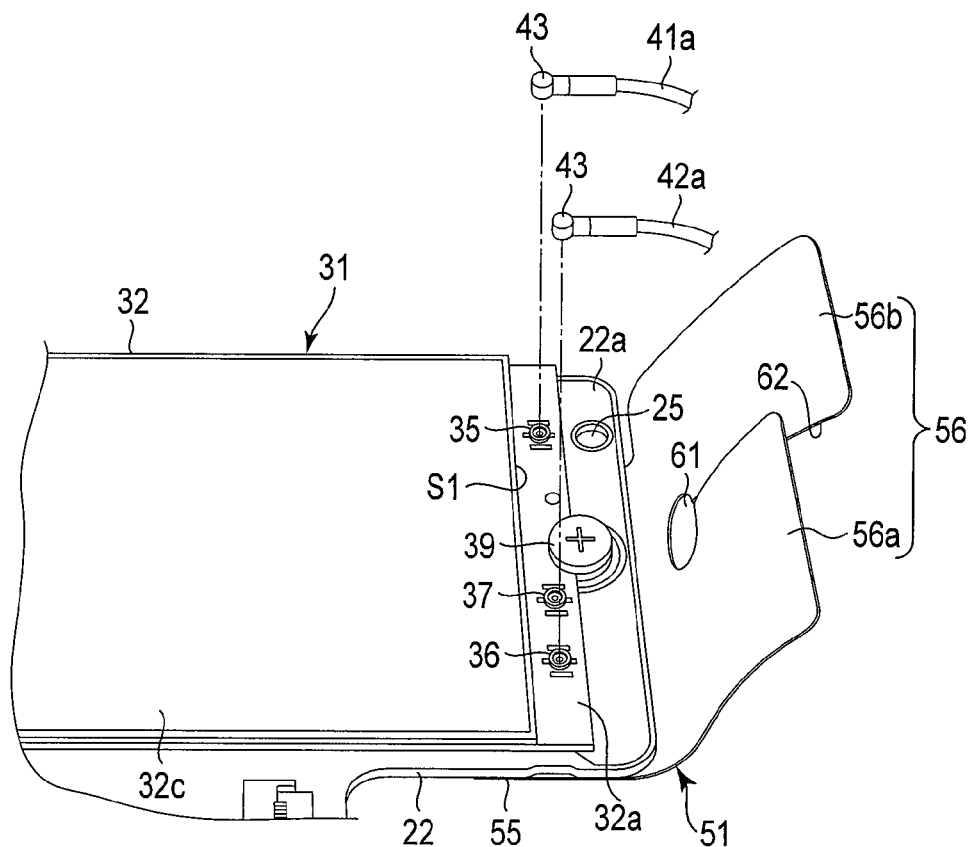
F I G. 9
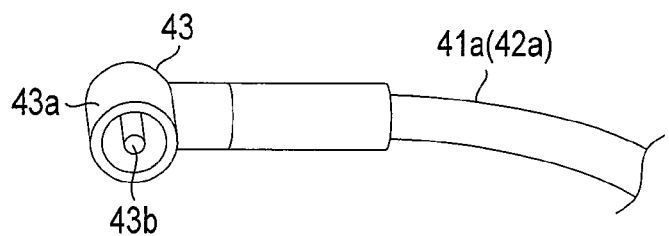
F I G. 10

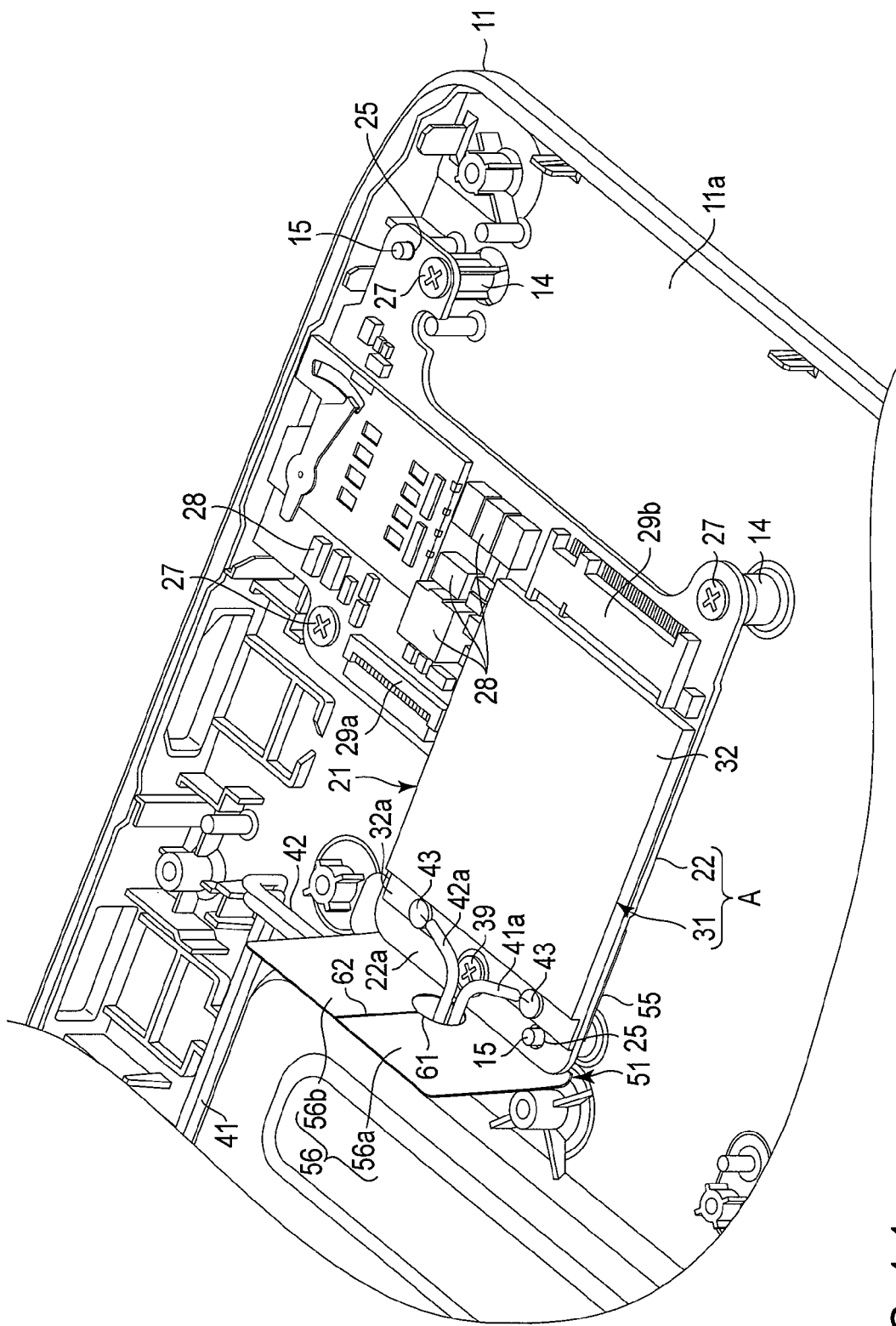
F I G. 11

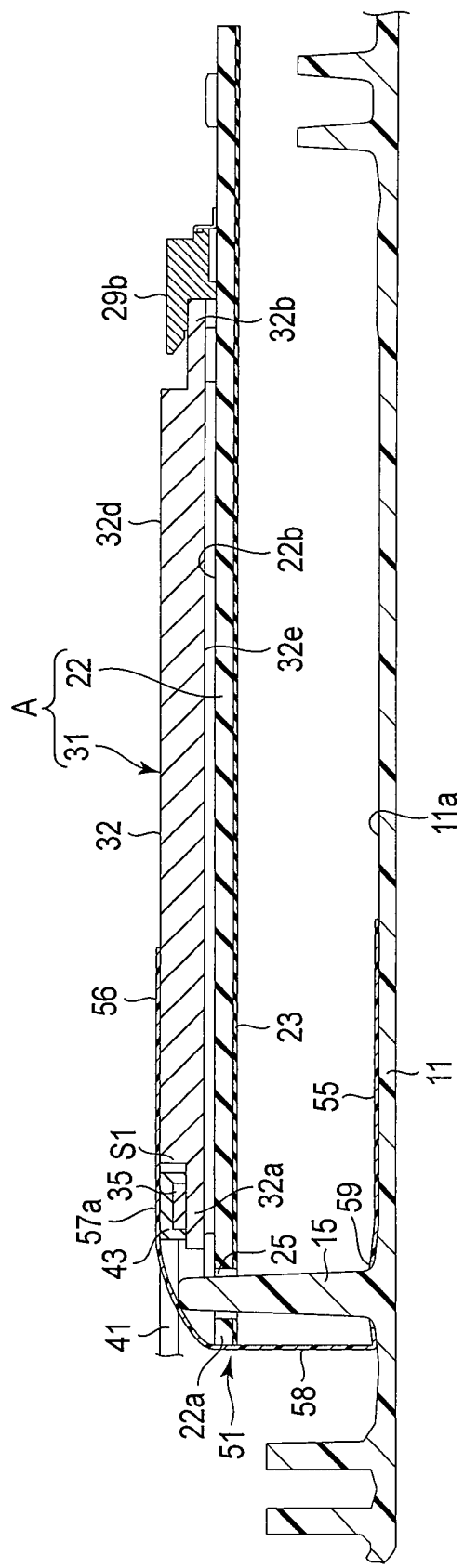
F I G. 14

ELECTRONIC APPARATUS

CROSS-REFERENCE TO RELATED APPLICATIONS

This application claims the benefit of U.S. Provisional Application No. 61/891,835, filed Oct. 16, 2013, the entire contents of which are incorporated herein by reference.

FIELD

Embodiments described herein relate generally to an electronic apparatus.

BACKGROUND

There is provided an electronic apparatus comprising a module for wireless communication accommodated in a housing.

It is desired that electronic apparatuses be thinner. To realize this, it is desired that a module terminal of a module and a cable terminal of a cable fitted thereto not be detached.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an exemplary sectional view along line F5-F5 in FIG. 3;

FIG. 9 is an exemplary perspective view illustrating a part of the wireless communication device shown in FIG. 2 and a cable terminal before the insulator is attached on a first surface of a module;

FIG. 10 is an exemplary perspective view illustrating a cable terminal of the cable of the wireless communication device shown in FIG. 2;

FIG. 11 is an exemplary perspective view illustrating a point, viewed from the back side, where the wireless communication device of the electronic apparatus shown in FIG. 1, before the insulator is attached on the first surface of the module;

FIG. 14 is an exemplary sectional view corresponding to FIG. 4, illustrating an electronic apparatus of a third embodiment.

DETAILED DESCRIPTION

Various embodiments will be described hereinafter with reference to the accompanying drawings.

In general, according to one embodiment, an electronic apparatus includes a first housing, a printed wiring board accommodated in the housing, a module arranged on the board, a plurality of cables, and a bendable sheet-shaped insulator. The module includes a module body having a first end portion protruding to form a step, and a plurality of module terminals attached to the first end portion. The first end portion is thinner than a main portion of the module body. The protrusion height of the module terminal to the first end portion is less than that of the step. The cables have cable terminals fitted to the module terminals. The insulator has a first adhesive portion adhered to an adhesive point located on the back side to the first surface opposite to the printed wiring board of the module body, a second adhesive portion adhered to the first surface, and a cover portion that is continued to the second adhesive portion and covers each cable terminal between the first and second adhesive portions.

Some components are expressed by two or more terms. Those terms are just examples. Those components may be further expressed by another or other terms. And the other components which are not expressed by two or more terms may be expressed by another or other terms.

FIGS. 1 to 11 illustrate an electronic apparatus 1 of a first embodiment. The electronic apparatus 1 is, for example, a notebook portable computer (i.e., notebook PC). It should be noted that an electronic apparatus to which the first embodiment is applicable is not limited to this example. The first embodiment is widely applicable to various types of electronic apparatuses such as a television receiver, a tablet (i.e., slate) portable computer, a cell phone (including smart phone) and a game console.

Figure 1:
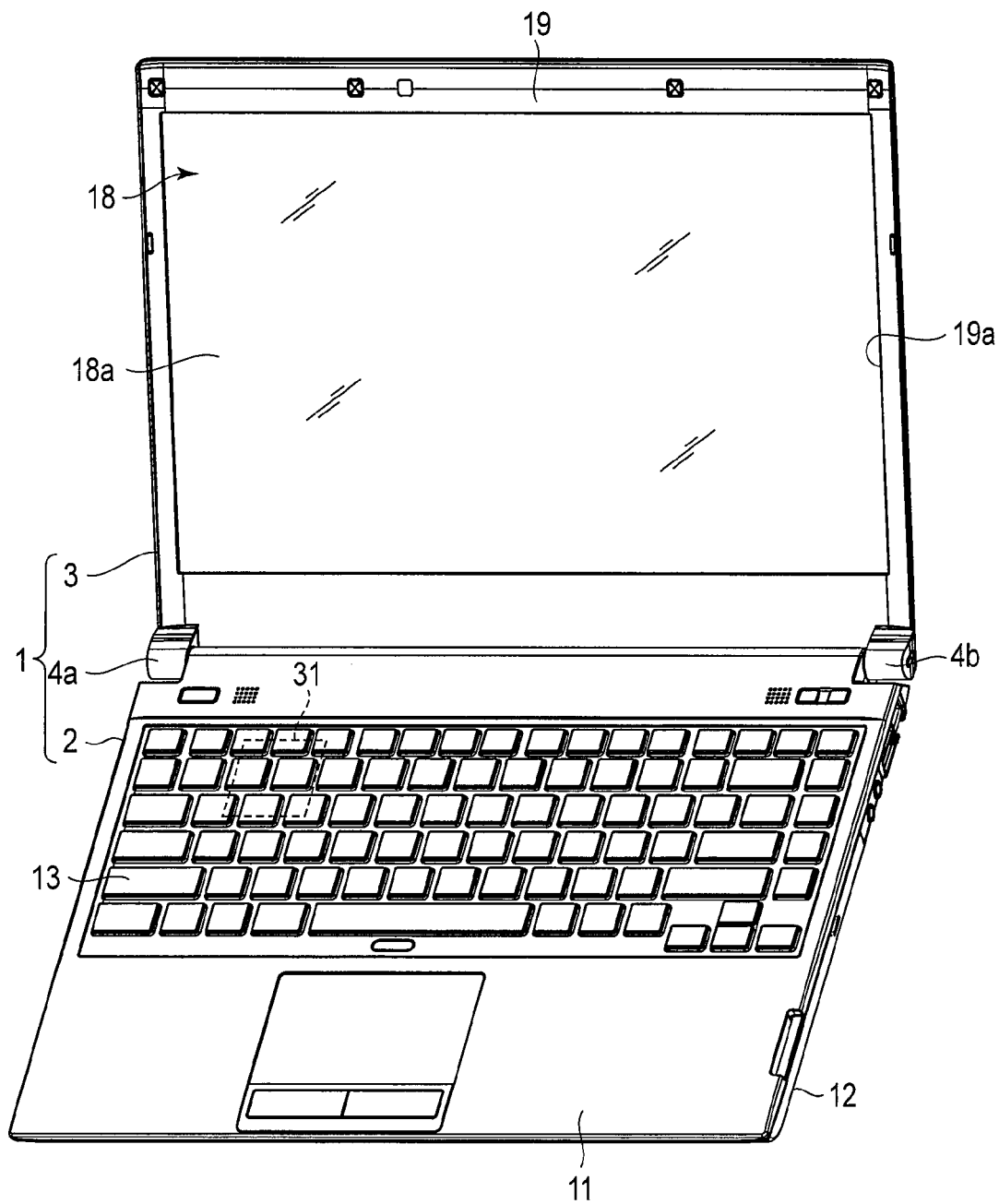
FIG. 1 is an exemplary perspective view of an electronic apparatus of a first embodiment.

As shown in FIG. 1, the electronic apparatus 1 has a first housing 2, a second housing 3, and a pair of hinges 4a and 4b. The first housing 2 is, for example, a main housing. The first housing 2 accommodates, for example, a circuit board (not shown) as a main board.

The first housing 2 is formed into a flat box shape by combining an upper case member 11 and a lower case member 12. In the description that follows, upper, lower, left and right are defined from the point view of a user. Also, a location close to the user is defined as front, while a location distant from the user is defined as back.

The upper case member 11 extends in a longitudinal direction (for example, substantially horizontal direction) of the first housing 2. A keyboard 13 as an example of an input portion is provided on the upper case member 11. The input portion provided on the upper case member 11 may be, for example, a touch panel (i.e., touch sensor) or other input apparatus, not limited to the keyboard 13.

Also, the lower case member 12 extends in a longitudinal direction of the first housing 2. When the electronic apparatus 1 is placed on a desk, the lower case member 12 faces the desk surface (i.e., external placement surface).

The second housing 3 is a display housing, for example. The second housing 3 accommodates a display 18 (i.e., display module or unit). An example of the display 18 is a liquid crystal display device, not limited thereto. The display 18 has a display screen 18a that displays an image.

The second housing 3 is formed into a flat box shape. A front wall 19 of the second housing 3 is provided with an opening 19a, on which the display screen 18a is exposed.

The hinges 4a and 4b are rotatably attached (i.e., openable and closable) to the first housing 2 and the second housing 3. This makes the electronic apparatus 1 openable and closable (i.e., deformable or foldable). The second housing 3 is rotatable between a first state (for example, closing state) and a second state (for example, opening state) as mentioned below.

In the first state, the second housing 3 is overlapped with the first housing 2 so that the electronic apparatus 1 is closed. Specifically, the upper cover member 11 of the first housing 2 and the front wall 19 of the second housing 3 are overlapped with each other so that the display screen 18a and the keyboard 13 are hidden from outside.

In the second state, the second housing 3 is stood by the first housing 2 so that the electronic apparatus 1 is open. Specifically, the display screen 18a and the keyboard 13 are exposed outside.

The upper case member 11 comprises a plurality of bosses 14 with screw holes for arranging a wireless communication device 21 (described below) and a plurality of protrusions 15 for positioning. These bosses 14 and protrusions 15 are formed integrally with the upper case member 11, protruding from an inner surface 11a of an upper wall portion of the upper case member 11 toward the lower case member 12.

Figure 2:
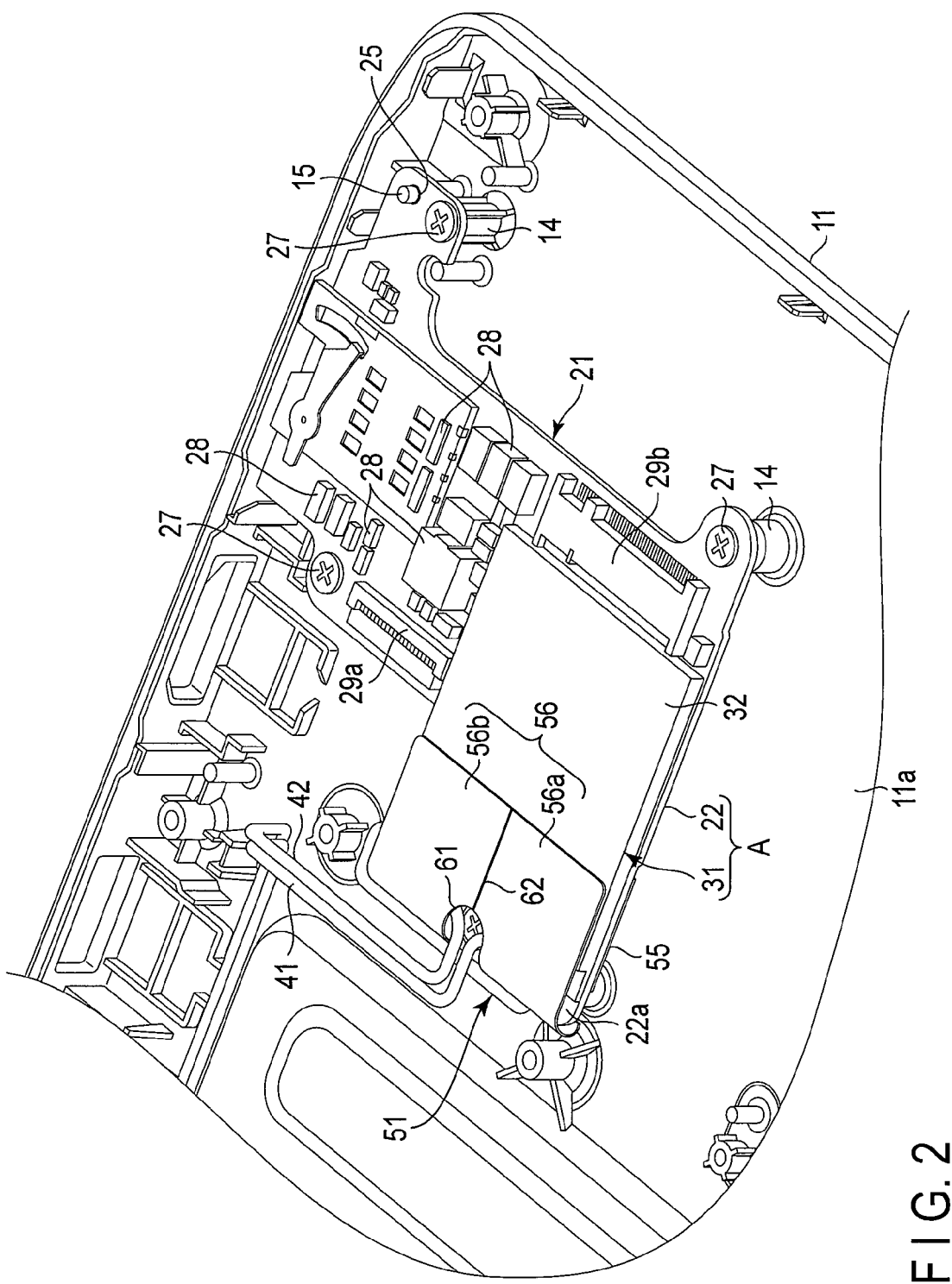
FIG. 2 is an exemplary perspective view illustrating a point, viewed from the back side, where a wireless communication device of the electronic apparatus shown in FIG. 1 is arranged.

It should be noted that FIGS. 2 and 11 are perspective views illustrating a point where the wireless communication device 21 (described below) with the lower case member 12 detached and the upper case member 11 upside down. Since FIG. 4 is a sectional view along line F4-F4 in FIG. 3, the bosses 14 and the protrusions 15 are drawn upward in FIGS. 2, 4 and 11.

The electronic apparatus 1 comprises the wireless communication device 21, which is accommodated in the first housing 2. As shown in FIG. 2, the wireless communication device 21 comprises a printed wiring board 22, a module 31, a plurality of, for example, two cables 41 and 42, and a sheet of insulator 51 for retaining terminals.

The printed wiring board 22 is a control board for wireless communication. On the surface of the printed wiring board 22 (i.e., a component mounting surface 22b), each type of electronic component 28 for controlling wireless communication, and connectors 29a and 29b are mounted around the module 31. An insulating sheet 23 is adhered to the printed wiring board 22. The insulating sheet 23 is a back surface of the printed wiring board 22. This back surface is smooth.

Figure 8:
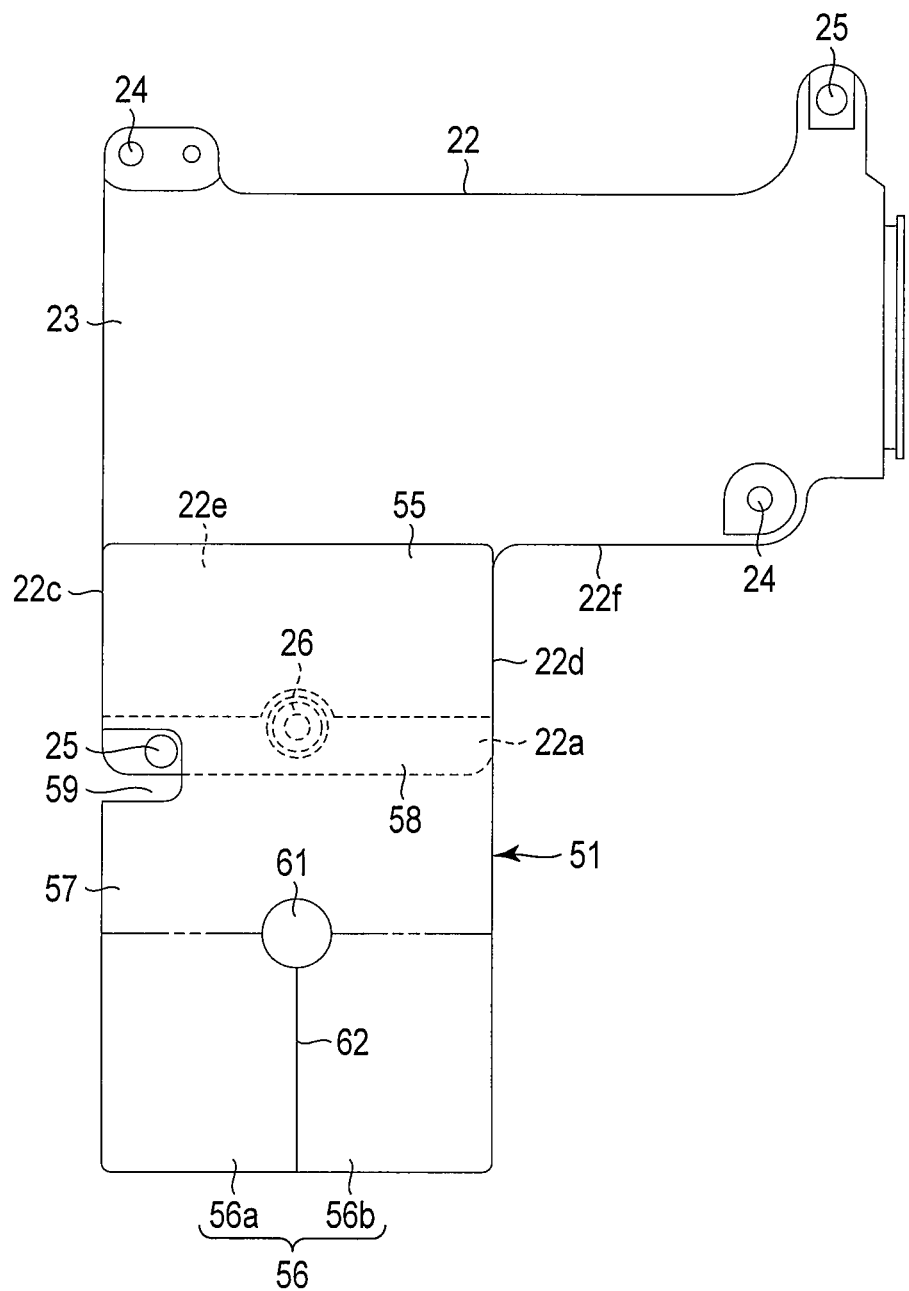
FIG. 8 is an exemplary backside view illustrating that the insulator is attached to a printed wiring board for wireless communication shown in FIG. 6.

As shown in FIG. 8, the printed wiring board 22 has an adhesive surface 22e as an adhesive point. The adhesive surface 22e is a part of the smooth back surface of the portion sandwiched between a first side edge 22c and a second side edge 22d. The first side edge 22c and the second side edge 22d extend in a front-back direction, being parallel with each other.

The adhesive surface 22e (i.e., adhesive point) is located on the back side to a surface 32d (i.e., first surface) opposite to the printed wiring board 22 of a module body 32 (described below). The surface 32d is parallel to the back surface of the printed wiring board 22 as an example.

As shown in FIG. 8, the printed wiring board 22 has the same number of fitting holes 24 as the bosses 14. The fitting holes 24 are arranged in positions corresponding to the arrangements of the plurality of bosses 14. Further, the printed wiring board 22 has the same number of holes 25 for positioning as the protrusions 15. The holes 25 are arranged in positions corresponding to the arrangements of the plurality of the protrusions 15.

The printed wiring board 22 has a screw receiving portion, which is formed by, for example, a stud nut 26. The stud nut 26 is fixed to the center portion in a longitudinal direction of an edge portion 22a, close to the front, of the printed wiring board 22. Since the stud nut 26 is not covered by the insulating sheet 23, the stud nut 26 is attached so as to be exposed on the back surface of the printed wiring board 22.

The printed wiring board 22 is supported by the tip of each boss 14 by directing the insulating sheet 23 to the inner surface 11a of the upper case member 11. This supporting state is fixed by a screw 27 passed into each of the fitting holes 24 and screwed to the bosses 14. Under such a fixing structure, the printed wiring board 22 is arranged parallel to (i.e., substantially in a horizontal direction of) the upper wall portion of the upper case member 11.

The module 31 is, for example, an antenna module for wireless communication in compliance with the Next Generation Form Factor (NGFF) standard. The maximum thickness of the module 31 is 3.85 mm. The module 31 comprises the module body 32 and a plurality of, for example, three module terminals 35, 36 and 37. The module terminal 37 may be omitted.

Figure 12:
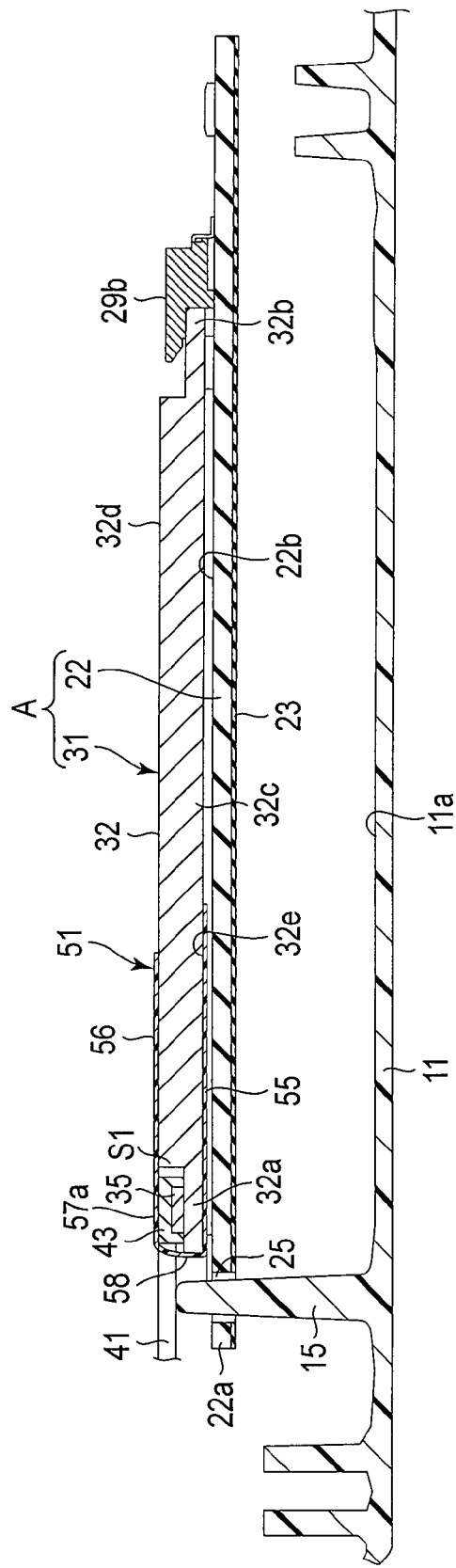
FIG. 12 is an exemplary sectional view corresponding to FIG. 4, illustrating an electronic apparatus of a second embodiment.

As shown in FIGS. 11 and 12, the module body 32 is flat, whose plan-view configuration is laterally-long square, for example. The module body 32 comprises a first end portion 32a (for example, front end portion) and a second end portion 32b (for example, back end portion) located opposite to the first end portion 32a.

Each of the back surfaces of the first end portion 32a, the second end portion 32b, and a main portion 32c therebetween are continuously flush, extending in a substantially horizontal direction. The main portion 32c has a maximum thickness. The thickness of the first end portion 32a and the second end portion 32b is thinner than that of the main portion 32c.

The first end portion 32a protrudes laterally (for example, forward) from the main portion 32c, forming a step S1 with the main portion 32c. Similarly, the second end portion 32b protrudes laterally (for example, backward) from the main portion 32c, forming a step with the main portion 32c. The second end portion 32b is detachably insertion-connected to the connector 29b.

The module terminals 35, 36 and 37 are attached to the first end portion 32a. The module terminals 35 and 36 are arranged to the end in a longitudinal direction of the first end portion 32a, while the module terminal 37 is arranged in the first end portion 32a in a position between the module terminals 35 and 36. The module terminals 35, 36 and 37 are electrically connected to components such as an antenna element built into the main portion 32c.

Each of the module terminals 35, 36 and 37 protrudes from the first end portion 32a toward the lower case member 12. The circumference of this protruding portion is circular. A protrusion height Ha of the module terminals 35, 36 and 37 to the first end portion 32a is less than Hb, a height of step S1. Each of the module terminals 35, 36 and 37 has a connector hole for electrical connection that opens in the center of the tip surface of the protruding portion.

The module 31 is arranged on the printed wiring board 22. The process of this arrangement will be explained below.

First of all, the second end portion 32b of the module 31 is insertion-connected to the connector 29b, by which the module 31 is overlapped with the printed wiring board 22.

In this state, a back surface 32e (i.e., second surface) of the module body 32 opposite to the surface 32d (first surface) is approximated to the component mounting surface 22b of the printed wiring board 22. In the same state, the stud nut 26 cannot be covered up by the first end portion 32a.

In addition, in the same state, the edge portion 22a of the printed wiring board 22 protrudes in a protruding direction (for example, forward) of the first end portion 32a to the main portion 32c than the first end portion 32a of the module body 32. However, the edge portion 22a does not necessarily protrude to the first end portion 32a. For example, the tip surface of the first end portion 32a and the tip surface extending in a longitudinal direction of the edge portion 22a may be continued flush horizontally. Alternatively, the tip portion of the first end portion 32a may recede to the tip surface extending in a longitudinal direction of the edge portion 22a.

Next, a screw 39 is screwed to the stud nut 26, by which the first end portion 32a is pressed by the edge portion 22a at the head of the screw 39 and the module 31 is attached. An assembly A is formed by the printed wiring board 22 and the module 31 thus assembled.

Cables 41 and 42 are used as antenna cable. It is preferable that the length of the cables 41 and 42 be the same so that components can be easily managed. The cables 41 and 42 have the same structure and have a cable terminal 43, for example, at least at one end of a coaxial cable.

As shown in FIG. 10, the cable terminal 43 has a tubular portion 43a and a connector pin 43b. The tubular portion 43a is cylindrical, with an insulating member (not shown) attached to its inner perimeter. The tubular portion 43a gets connected by being fixed to any of the module terminals 35, 36 and 37. The connector pin 43b is inserted into the connector holes of the module terminals 35, 36 and 37, by which the module terminal and the cable terminal 43 are electrically connected.

The cable terminal 43 of the cable 41 is fixed to the circumference of the module terminal 35. The cable terminal 43 of the cable 42 is fixed to the circumference of the module terminal 36.

Figure 3:
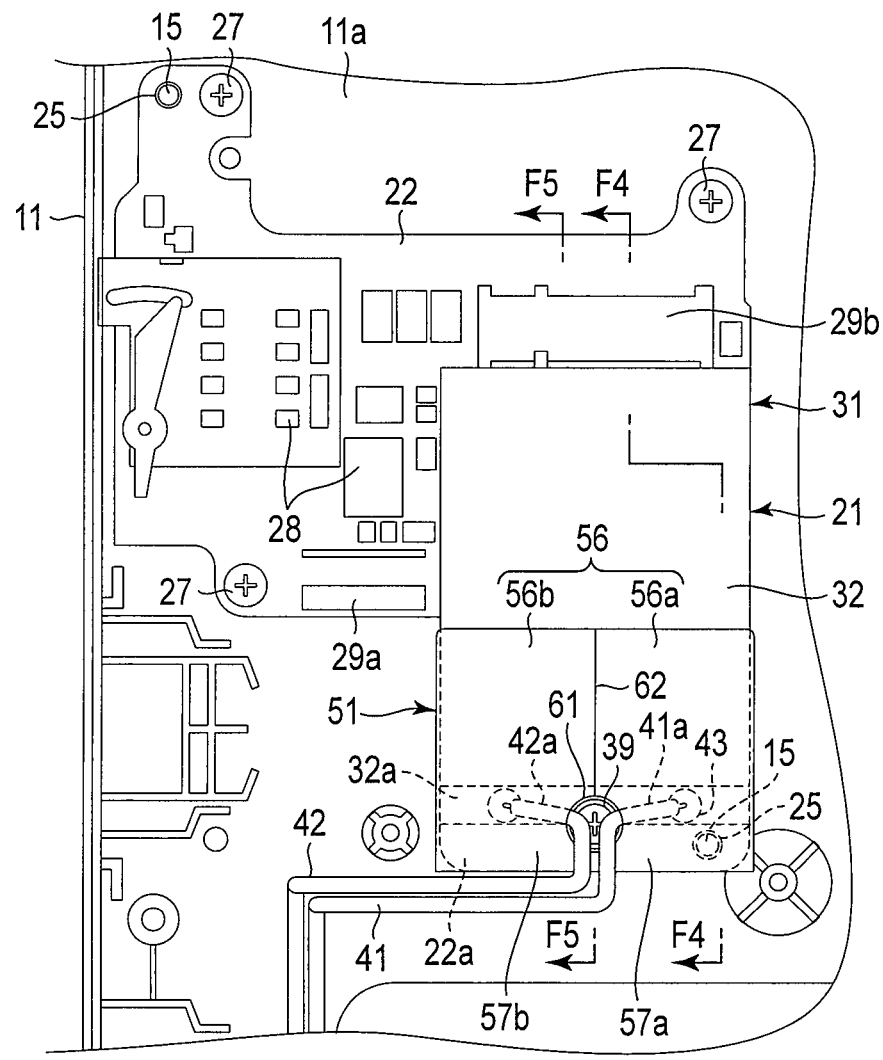
FIG. 3 is an exemplary backside view illustrating the point shown in FIG. 2.
Figure 4:
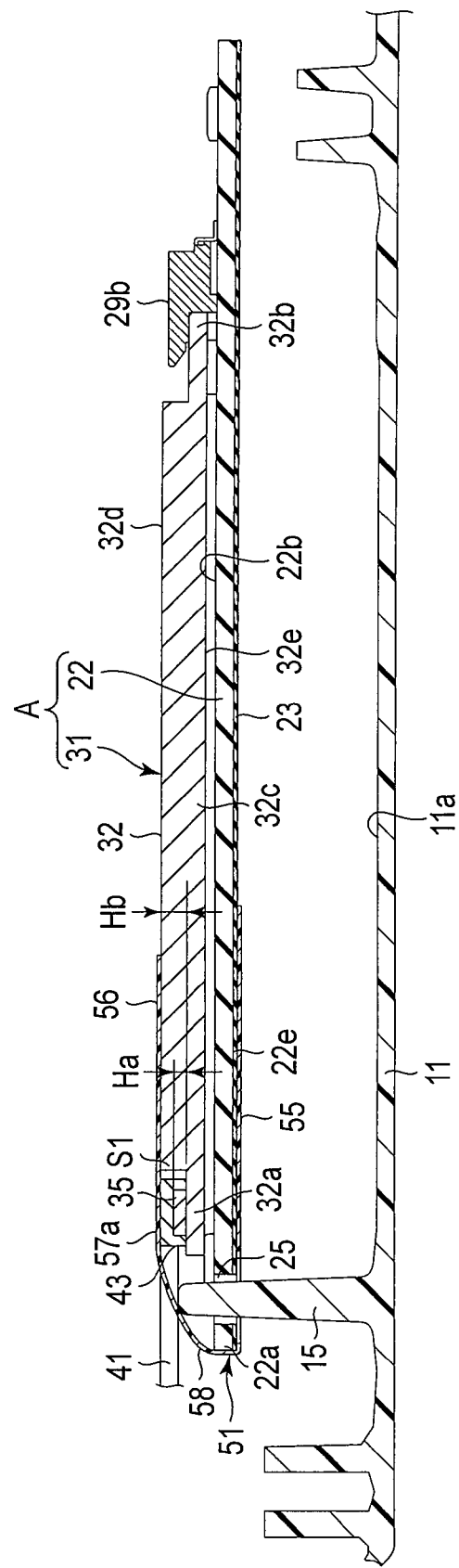
FIG. 4 is an exemplary sectional view along line F4-F4 in FIG. 3.

As shown in FIGS. 3 and 11, end portions 41a and 42a of the cables 41 and 42 are wired along a longitudinal direction of the first end portion 32a on the first end portion 32a and approximated with each other. In addition, the cables 41 and 42 are wired to the inside of the upper case member 11 and connected to predetermined electrical components so that they are put together to contact with each other.

The insulator 51 is sheet-shaped and bendable (i.e., freely bendable). The insulator 51 is formed by providing an adhesive layer to a sheet-shaped base member 52.

For the base member 52, an electrical insulating material, for example, a polyethylene terephtalate (PET) sheet, can be preferably used. The base member 52 is, for example, square, i.e., substantially rectangle. It is preferable that the width of the base member 52 be almost equal to that of the adhesive surface 22e of the printed wiring board 22. The width of the adhesive surface 22e is defined by the first side edge 22c and the second side edge 22d.

Figure 6:
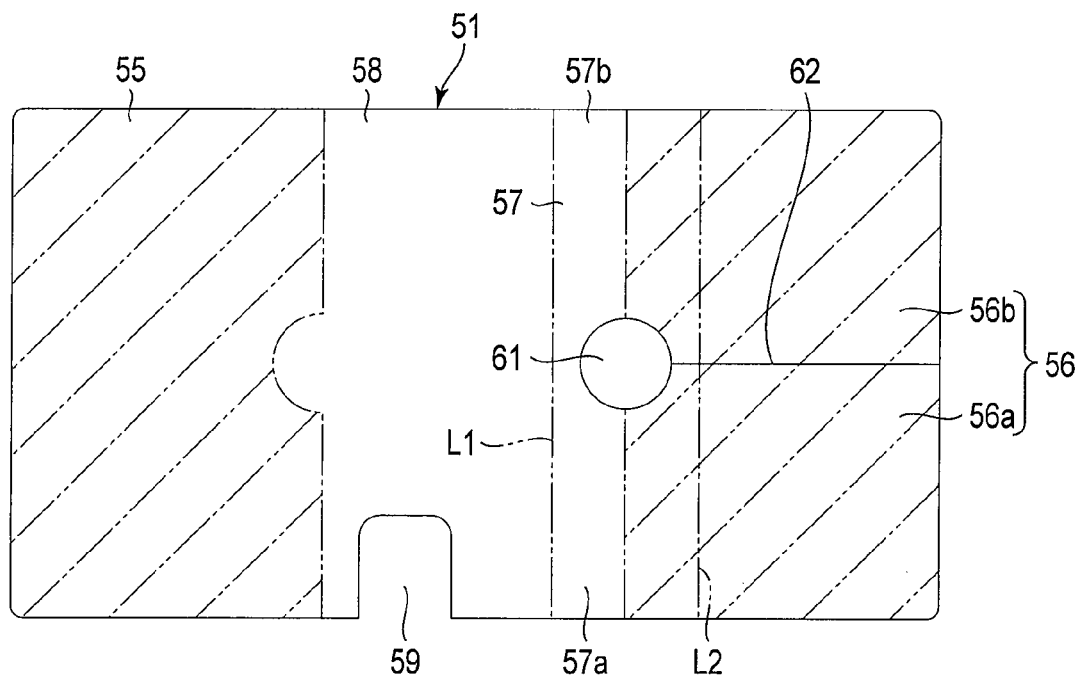
FIG. 6 is an exemplary developed view illustrating an insulator of the wireless communication device shown in FIG. 2.
Figure 7:
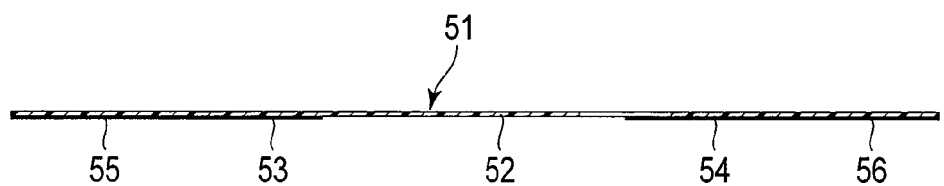
FIG. 7 is an exemplary sectional view of the insulator shown in FIG. 6.

The adhesive layer is laminated on one surface of the base member 52 as illustrated in FIGS. 6 and 7. That is, a first adhesive layer 53 is laminated in a portion on the side of one end portion in a longitudinal direction of the base member 52, while a second adhesive layer 54 is laminated in a portion on the side of the other end portion in a longitudinal direction of the base member 52. Although the adhesive layer may be on the whole of one surface of the base member 52, it is preferable that the first adhesive layer 53 and the second adhesive layer 54 be separately arranged since the amount of adhesive used can be reduced.

One end portion of the base member 52 and the first adhesive layer 53 form a first adhesive portion 55 of the insulator 51. Similarly, the other end of the base member 52 and the second adhesive layer 54 form a second adhesive portion 56 of the insulator 51.

FIG. 6 shows each of the first adhesive layer 53 and the second adhesive layer 54 with parallel oblique lines of two-dot chain lines so that the layers can be identified easily. The second adhesive layer 54 crosses a part of a cover portion 57 (described below) in the first embodiment but also can be arranged so that it does not cross.

In the structure of the second adhesive layer 54 crossing the cover portion 57 (described below), the adhesive area of the second adhesive portion 56 is larger. Such a structure is preferable as enhancing reliability of keeping the cover portion 57 tension-applied. In a structure where the second adhesive layer 54 does not cross the cover portion 57, the cable terminal 43 is not adhered to the cover portion 57. Such a structure is preferable since there is no concern whether the cable terminal 43 is moved by the tension of the cover portion 57.

The insulator 51 has the cover portion 57, which is continued to the second adhesive portion 56 between the first adhesive portion 55 and the second adhesive portion 56. In FIG. 6, the cover portion 57 represents a region sandwiched between two-dot chain lines L1 and L2. The cover portion 57 is continued to the first adhesive portion 55 through a non-adhesive portion 58 that does not have an adhesive layer.

The insulator 51 has a passage portion 61, into which the cables 41 and 42 are passed. The passage portion 61 is formed by, for example, a circular hole that is open to the cover portion 57. The passage portion 61 is located in the center of a width direction of the insulator 51.

The insulator 51 has a separating portion 62. The separating portion 62 is made by, for example, slit. The slit (separating portion 62) is located in the center of a width direction of the insulator 51, extending in a longitudinal direction of the insulator 51. One end of the slit reaches one end edge in a longitudinal direction of the insulator 51 while the other end reaches the passage portion 61.

Therefore, the second adhesive portion 56 is separated into a first adhesive region 56a and a second adhesive region 56b by the slit (separating portion 62). In addition, the cover portion 57 is separated into a first cover region 57a and a second cover region 57b by the passage portion 61 and the separating portion 62 that are mutually continued.

The separating portion 62 is not limited to slit. For example, it is possible that the separating portion 62 is formed by a slot having the same width as the diameter of the passage portion 61. However, it is preferable that the separating portion 62 be slit since the adhesive areas of the first adhesive region 56a and the second adhesive region 56b are larger.

The insulator 51 has a gap 59 released to its side edge. The gap 59 is U-shaped, for example, and arranged to accept the protrusion 15 in a front side location.

Subsequently, a process of assembling the wireless communication device 21 will be explained.

In this case, the printed wiring board 22 and the module 31 are prepared in a state of the assembly A, which has been already assembled in the above-mentioned process.

First of all, the insulator 51 is attached to the assembly A. Specifically, the first adhesive portion 55 and a part of the non-adhesive portion 58 of the insulator 51 face the back surface opposite to the component mounting surface 22b of the printed wiring board 22. In this state, the first adhesive portion 55 is adhered to the adhesive surface 22e (i.e., adhesive point) by the first adhesive layer 53. The adhesive surface 22e comprises a part of the back surface of the printed wiring board 22.

In this case, both side edges of the first adhesive portion 55 are aligned with the first side edge 22c and the second side edge 22d of the printed wiring board 22. It is therefore possible to fix a position where the insulator 51 is attached in a right and left direction of the printed wiring board 22 to become adhered. Further, the tip portion of the first adhesive portion 55 is aligned with an edge 22f of the insulator 51 perpendicularly continued to the first side edge 22c. It is therefore possible to fix a position where the insulator 51 is attached in a back and forth direction of the printed wiring board 22 to become adhered.

FIG. 8 shows that the insulator 51 is thus adhered to the back surface of the printed wiring board 22. In this state, a portion close to the cover portion 57 of the non-adhesive portion 58 as well as the second adhesive portion 56 and the cover potion 57 of the insulator 51 protrude from the edge portion 22a of the printed wiring board 22. In the same state, the gap 59 of the insulator 51 is opposed to the hole 25 of the printed wiring board 22. In the same state, the stud nut 26 is covered by a region of the insulator 51 along the back surface of the printed wiring board 22.

Next, the assembly A is fixed to the upper case member 11.

First of all, each of the holes 25 of the printed wiring board 22 is fixed to each of the protrusions 15 of the upper case member 11 so that each protrusion 15 is passed into the holes 25. The printed wiring board 22 is then supported by the tip surface of each of the bosses 14. In this case, a screw hole of each of the bosses 14 is opposed to each of the fitting holes 24 of the printed wiring board 22.

Next, the screw 27 is passed into each of the fitting holes 24 and screwed to the boss 14 so that the printed wiring board 22 is attached to the upper case member 11.

In such a process, the assembly A is arranged in the upper case member 11. In this state, the back surface of the printed wiring board 22 and the insulator 51 attached thereon are opposed to the inner surface lie of the upper case member 11. Also, if the inner surface 11a is cover by other insulators, the back surface of the printed wiring board 22 and the insulator 51 attached thereon are opposed to the other insulators. It should be noted that when the first housing 2 is assembled, the surface 32d of the module body 32 is separated further than the back surface of the printed wiring board 22 on the basis of the inner surface 11a, being opposed to the inner surface (not shown) of the lower case member 12.

As mentioned above, the insulator 51 covers the stud nut 26 from the back surface of the printed wiring board 22, by which the screw shaft tip of the screw 27 is covered by the insulator 51. When a structure (not shown) is arranged between the inner surface 11a of the upper case member 11 and the printed wiring board 22, the structure is not formed by being interfered by the screw 27 with the assembly A attached to the upper case member 11. Therefore, it is possible to protect the structure.

Next, the cables 41 and 42, which have been already wired in a predetermined state in the upper case member 11, are connected to the module 31.

The cable 41 is connected by fitting the tubular portion 43a of the cable terminal 43 to the circumference of, for example, the module terminal 35 of the module 31. Then, the connector pin 43b of the cable terminal 43 is inserted into the connector hole of the module terminal 35. The cable terminal 43 and the module terminal 35 are thus electrically connected.

Similarly, the cable 42 is connected by fitting the tubular portion 43a of the cable terminal 43 to the circumference of, for example, the module terminal 36 of the module 31. Then, the connector pin 43b of the cable terminal 43 is inserted into the connector hole of the module terminal 36. The cable terminal 43 and the module terminal 36 are thus electrically connected.

The cable terminal 43, connected respectively to the module terminals 35 and 36 as mentioned above, is located at the same height as the surface 32d of the module body 32 or slightly shifted from the surface 32d to the printed wiring board 22.

The passage portion 61 and the separating portion 62 of the insulator 51 are shifted in a longitudinal direction of the edge portion 22a of the printed wiring board 22 to the connecting portion between the module terminal 35 and the cable terminal 43 of the cable 41 and the connecting portion between the module terminal 36 and the cable terminal 43 of the cable 42. Specifically, the passage portion 61 and the separating portion 62 are located between both connecting portions, more preferably, shifted from both connecting portions by the same distance.

Subsequently, each cable terminal 43 is retained by the insulator 51 in the following process so that the cable terminal 43 is not detached from the module terminals 35 and 36.

First of all, the end portion 41a of the cable 41 and the end portion 42a of the cable 42 are wired along a longitudinal direction of the edge portion 22a (i.e., direction of the step S1 extending). The end portions 41a and 42a are then approximated to correspond with each other.

Next, the cables 41 and 42 are put together by being bent at an angle substantially perpendicular to the end portions 41a and 42a. Subsequently, the cables 41 and 42, which have been put together, are passed into the passage portion 61 of the insulator 51.

In this case, as shown in FIG. 9, the second adhesive portion 56 of the insulator 51 is bent upward to open the separating portion 62. By way of the separating portion 62, the intermediate portions of the cables 41 and 42 are guided to the passage portion 61. It is therefore easy to pass the cables 41 and 42 into the passage portion 61 without passing the cables 41 and 42 into the passage portion 61 from the end.

Further, the separating portion 62 is closed after the cables 41 and 42 are guided to the passage portion 61, since the separating portion 62 is slit. Therefore, the cables 41 and 42, which are passed into the passage portion 61, are less likely to be detached by way of the separating portion 62. FIG. 11 shows that the cables 41 and 42 are passed into the passage portion 61 of the insulator 51.

Lastly, the second adhesive portion 56 of the insulator 51 is adhered to the surface 32d of the module body 32 while the insulator 51 is dragged. The insulator 51 is then arranged over the surface 32d of the module body 32 from the back surface of the printed wiring board 22, rolling the edge portion 22a of the printed wiring board 22 and the first end portion 32a of the module body 32.

The second adhesive portion 56 is separated into two sections by the separating portion 62. Therefore, the first adhesive region 56a and the second adhesive region 56b are separately connected to the surface 32d of the module body 32.

By adhering the first adhesive region 56a to the surface 32d, the first cover region 57a of the cover portion 57 of the insulator 51 remains tension-applied. The first cover region 57a protrudes over the edge portion 22a of the printed wiring board 22 and the surface 32d of the module body 32. The cable terminal 43 of the cable 41 and the end portion 41a of the cable 41 continued to the terminal are covered by the first cover region 57a.

Similarly, by adhering the second adhesive region 56b to the surface 32d, the second cover region 57b of the cover portion 57 of the insulator 51 remains tension-applied. The second cover region 57b protrudes over the edge portion 22a of the printed wiring board 22 and the surface 32d of the module body 32. The cable terminal 43 of the cable 42 and the end portion 42a of the cable 42 continued to the terminal are covered by the second cover region 57b.

By the insulator 51 arranged as mentioned above, the cable terminals 43 remains fixed to the module terminals 35 and 36.

In this state, the first cover region 57a of the insulator 51 and the cable terminal 43 fixed to the module terminal 35 are contacted, or approximated with a slight gap. Similarly, the second cover region 57b of the insulator 51 and the cable terminal 43 fixed to the module terminal 36 are contacted, or approximated with a slight gap. When there is a gap (separation distance) between the cable terminals 43 and the cover portion 57, the separation distance is shorter than the fixing depth of the cable terminals 43 to the module terminals 35 and 36.

It is preferable that the first cover region 57a and the second cover region 57b be kept tension-applied since the arrangement of the first cover region 57a and the second cover region 57b to the cable terminals 43 covered by these cover regions is properly maintained. The phrase "arrangement of . . . properly maintained" means that the cover portion 57 is arranged so that the cable terminals 43 are not detached.

FIG. 2 shows that the wireless communication device 21 is installed into the upper case member 11 in the above-mentioned process. As shown in FIG. 2, the cables 41 and 42 are passed into the passage portion 61 in a location shifted in a longitudinal direction of the end portion 22a. In such a wiring structure, a region bent from the end portion 41a of the cable 41 and a region bent from the end portion 42a of the cable 42 contact the edge of a hole of the passage portion 61. The cables 41 and 42 dragged from the passage portion 61 are wired along a predetermined path in the upper case member 11.

The electronic apparatus 1 in the above-mentioned structure, being thin, comprises the wireless communication device 21, which is thin in conformance with the NGFF standard. Since the wireless communication device 21 is thinner, the protrusion height Ha of the module terminals 35, 36 and 37 are low (i.e., the module terminals 35, 36 and 37 are short). This makes the fixing depth of the cable terminals 43 to the module terminals 35 and 36 shallow.

Therefore, when the cables 41 and 42 are not properly wired to the module 31, it is more likely that the cable terminals 43 are detached from the module terminals 35 and 36.

The electronic apparatus 1 of the first embodiment comprises the insulator 51 to keep the cable terminals 43 fixed to the module terminals 35 and 36.

As mentioned above, the insulator 51 is arranged over the surface 32d of the module body 32 from the back surface of the printed wiring board 22, rolling the edge portion 22a of the printed wiring board 22 and the first end portion 32a of the module body 32. The cover portion 57 of the insulator 51 covers the cable terminals 43 in a tension-applied state.

Therefore, when the cable terminals 43 are likely to be detached from the module terminals 35 and 36, the cable terminals 43 can be retained so as not to be detached by the cover portion 57.

In this case, when the cable terminals 43 contacts the cover portion 57, the cover portion 57 works as a stopper to prevent the cable terminals 43 from moving in a direction of being detached from the module terminals 35 and 36.

Also, when the cable terminals 43 and the cover portion 57 are approximated with a separation distance, first of all, the terminals 43 are moved in a direction of being detached from the module terminals 35 and 36 by a distance in which the separation distance is eliminated. However, the cover portion 57 works as a stopper immediately thereafter. The cable terminals 43 remains fixed to the module terminals 35 and 36.

Further, in the first embodiment, the cover portion 57 covers the end portions 41a and 42a of the cables 41 and 42 in addition to the cable terminals 43. The cables 41 and 42 contact or are able to contact the edge of the passage portion 61.

Therefore, although the cables 41 and 42 are moved by wiring the cables 41 and 42 into the upper case member 11, the contact between the cover portion 57 and the cables 41 and 42 prevents this motion from spreading to the end portions 41a and 42a. The cable terminals 43 are then less likely to receive a force in a direction of being detached from the module terminals 35 and 36 and to be detached from the module terminals 35 and 36.

In addition, in the first embodiment, as mentioned above, the end portions 41a and 42a are kept wired in a longitudinal direction of the edge portion 22a of the printed wiring board 22 by the cover portion 57 of the insulator 51 that covers the end portions 41a and 42a. Also, the cables 41 and 42 are passed into the passage portion 61 of the insulator 51 in a direction orthogonal to the fixing direction of the cable terminals 43 to the module terminals 35 and 36 and in a direction of being separated from the module body 32.

The end portions 41a and 42a of the cables 41 and 42 are then kept properly wired. Therefore, the cable terminals 43 are less likely to receive a force in a direction of being detached from the module terminals 35 and 36 to maintain not so that the cable terminals 43 are not detached.

Although the module 31, which is thin, is appropriate for contributing to making the electronic apparatus 1 thinner, the module 31 and the cables 41 and 42 are less likely to be disconnected. Therefore, it is possible that efficiency of assembly by retrying the connection at the time of production is not reduced. Also, it is possible to improve the quality of the electronic apparatus 1 while the connection reliability after production is secured.

As mentioned above, the insulator 51 keeps the end portions 41a and 42a of the cables 41 and 42 wired along the module 31 and prevents the cable terminals 43 fixed to the module terminals 35 and 36 from being detached. The insulator 51 is formed by arranging an adhesive layer (for example, the first adhesive layer 53 and the second adhesive layer 54) to the base member 52, which is bendable, thin and sheet-shaped. Therefore, since the thickness of the wireless communication device 21 does not increase greatly even by using the insulator 51, the insulator does not prevent the electronic apparatus 1 from becoming thinner.

Figure 13:
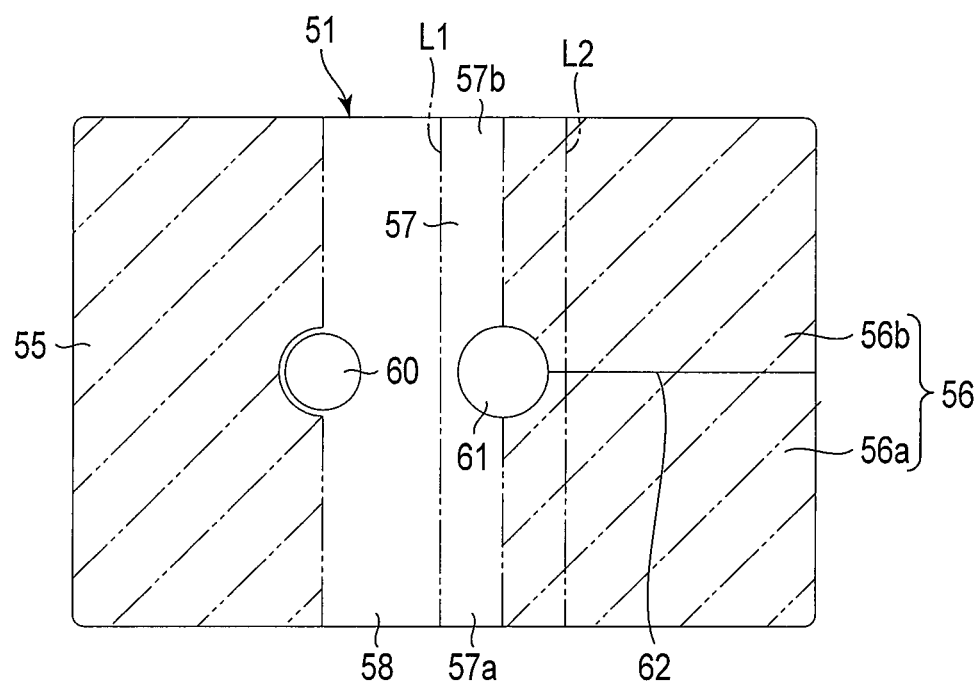
FIG. 13 is an exemplary developed view illustrating the insulator of the electronic apparatus shown in FIG. 12.

FIGS. 12 and 13 show a second embodiment. The second embodiment is the same as the first embodiment other than the matters described below. Therefore, in the second embodiment, the same structure as the first embodiment and the structure having the similar function are given the same reference number as the first embodiment to omit the explanation. Also, the same effect as the first embodiment is not explained. Further, in the following explanation, regarding the structures that are not shown in FIGS. 12 and 13, each figure of the first embodiment is referred to.

In the second embodiment, the structure of the insulator 51 for retaining terminals and the adhesive point, to which the first adhesive portion 55 is attached, are different from those of the first embodiment.

As shown in FIG. 13, the insulator comprises a screw passing hole 60. The screw passing hole 60 is arranged to span the first adhesive portion 55 and the non-adhesive portion 58.

As shown in FIG. 12, the back surface 32*e* (second surface) of the first end portion 32*a* of the module 31 is used as an adhesive point.

Next, a process of assembling the wireless communication device 21 in the second embodiment will be explained.

First of all, the first adhesive portion 55 of the insulator 51 is adhered to the back surface of the printed wiring board 22. A part of the non-adhesive portion 58 of the insulator 51, the cover portion 57 and the second adhesive portion 56 protrude from the edge portion 22*a* of the printed wiring board 22.

Next, the second end portion 32*b* of the module 31 is inserted and connected to the connector 29*b* so that the module 31 is overlapped with the printed wiring board 22. In this state, the screw passing hole 60 of the insulator 51 is opposed to the stud nut 26 (FIG. 5).

Subsequently, the screw 39 (FIG. 5) is screwed to the stud nut 26 from the front side of the printed wiring board 22. Then, the first end portion 32*a* is pressed to the printed wiring board 22 in the head of the screw 39, and the module 31 is attached. The assembly A is thus assembled.

In this state, connection is made by fixing the cable terminals 43 to the module terminals 35 and 36 (FIG. 9) of the module 31. After that, the cables 41 and 42 are passed into the passage portion 61 of the insulator 51. These operations are as explained in the first embodiment.

Thereafter, the second adhesive portion 56 of the insulator 51 is adhered to the surface 32*d* of the module body 32 while the insulator 51 is dragged. This operation is as explained in the first embodiment.

The insulator 51 is then arranged over the surface (first surface) 32*d* of the module body 32 from the back surface (second surface) 32*e* of the module body 32, rolling the first end portion 32*a* of the module body 32.

In this case, by adhering the first adhesive region 56*a* of the second adhesive portion 56 to the surface 32*d*, the first cover region 57*a* of the cover portion 57 remains tension-applied. The cable terminal 43 of the cable 41 (FIG. 3) and the end portion 41*a* (FIG. 3) of the cable 41 are covered by the first cover region 57*a*.

Similarly, by adhering the second adhesive region 56*b* of the second adhesive portion 56 to the surface 32*d*, the second cover region 57*b* of the cover portion 57 remains tension-applied. The cable terminal 43 of the cable 42 (FIG. 3) and the end portion 42*a* (FIG. 3) of the cable 42 are covered by the second cover region 57*b*.

The insulator 51 arranged as mentioned above keeps the end portions 41*a* and 42*a* of the cables 41 and 42 wired along the module 31 and prevents the cable terminals 43 fixed to the module terminals 35 and 36 from being detached.

The structures other than explained above are the same as the structures of the electronic apparatus 1 of the first embodiment including the structures that are not shown in FIGS. 12 and 13. Therefore, according to the structure of the electronic apparatus 1 of the second embodiment, the module 31 and the cables 41 and 42 are less likely to be disconnected for the reason given in the first embodiment, although there is the module 31, which is thin and appropriate for contributing to making the electronic apparatus 1 thinner. Also, since the insulator 51 is sheet-shaped, the thickness of the wireless communication device 21 does not greatly increase due to the use of the insulator 51. This allows the electronic apparatus 1 to be thinner.

Figure 15:
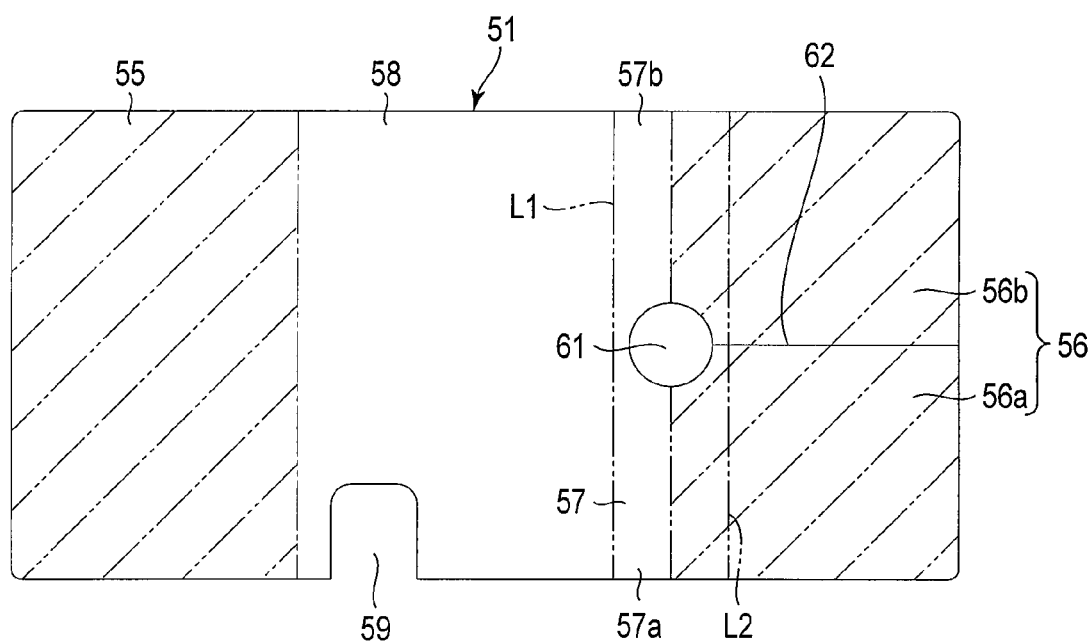
FIG. 15 is an exemplary developed view illustrating the insulator of the electronic apparatus shown in FIG. 14.

FIGS. 14 and 15 show a third embodiment. The third embodiment is the same as the first embodiment other than the matters described below. Therefore, in the third embodiment, the same structure as the first embodiment and the structure having the similar function are given the same reference number as the first embodiment to omit the explanation. Also, the same effect as the first embodiment is not explained. Further, in the following explanation, regarding the structures that are not shown in FIGS. 14 and 15, each figure of the first embodiment is referred to.

The third embodiment differs from the first embodiment in the structure of the insulator 51 for retaining terminals and the adhesive point, to which the first adhesive portion 55 is attached.

As shown in FIG. 14, the inner surface 11*a* of the upper case member 11 is used as an adhesive point.

Therefore, the non-adhesive portion 58 of the insulator 51 is longer than the non-adhesive portion 58 explained in the first embodiment. Also, the first adhesive layer 53 of the first adhesive portion 55 of the insulator 51 is laminated on the surface opposite to one surface of the base member 54 (FIG. 7), on which the second adhesive layer 54 is laminated.

In FIG. 14, the first adhesive portion 55 may be adhered to the inner surface 11*a* of the upper case member 11 on the left of the non-adhesive portion 58, instead of the right thereof. In this case, the first adhesive layer 53 and the second adhesive layer 54 are laminated on one surface of the base member 52 (FIG. 7).

Next, a process of assembling the wireless communication device 21 in the third embodiment will be explained.

First of all, the first adhesive portion 55 of the insulator 51 is adhered to the inner surface 11*a* of the upper case member 11.

Next, the assembly A, which has been prepared in advance, is screwed to the upper case member 11. This process is as explained above in the first embodiment.

Thereafter, the cable terminals 43 of the cables 41 and 42 (FIG. 3) are fixed and connected to the module terminals 35 and 36 (FIG. 9) of the module 31. After that, the cables 41 and 42 are passed into the passage portion 61 of the insulator 51, which is explained as above in the first embodiment.

Lastly, the second adhesive portion 56 of the insulator 51 is adhered to the surface 32*d* of the module body 32 while dragging the insulator 51, which is explained as above in the first embodiment.

The insulator 51 is then arranged over the surface 32*d* of the module body 32 from the inner surface 11*a* of the upper case member 11.

In this case, by adhering the first adhesive region 56*a* of the second adhesive portion 56 to the surface 32*d*, the first cover region 57*a* of the cover portion 57 remains tension-applied over the end portion 22*a* of the printed wiring board 22 and the surface 32*d* of the module 31. The cable terminal 43 of the cable 41 (FIG. 3) and the end portion 41a (FIG. 3) of the cable 41 are covered by the first cover region 57a.

Similarly, by adhering the second adhesive region 56b of the second adhesive portion 56 to the surface 32d, the second cover region 57b of the cover portion 57 remains tension-applied over the end portion 22a of the printed wiring board 22 and the surface 32d of the module 31. The cable terminal 43 of the cable 42 (FIG. 3) and the end portion 42a (FIG. 3) of the cable 42 are covered by the second cover region 57b.

The insulator 51 arranged as mentioned above keeps the end portions 41a and 42a of the cables 41 and 42 wired along the module 31 and prevents the cable terminals 43 fixed to the module terminals 35 and 36 from being detached.

The structures other than explained above are the same as the structures of the electronic apparatus 1 of the first embodiment including the structures that are not shown in FIGS. 14 and 15. Therefore, according to the structure of the electronic apparatus 1 of the third embodiment, the module 31 and the cables 41 and 42 are less likely to be disconnected for the reason given in the first embodiment, although the module 31, which is thin and appropriate for contributing to making the electronic apparatus 1 thinner. Also, since the insulator 51 is sheet-shaped, the thickness of the wireless communication device 21 does not greatly increase due to the use of the insulator 51. This allows the electronic apparatus 1 to be thinner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a first housing;
   a printed wiring board accommodated in the first housing;
   a module arranged on the printed wiring board, the module comprising a module body having a first end portion protruding to form a step and a plurality of module terminals attached to the first end portion, the first end portion being thinner than a main portion of the module body, a protrusion height of the module terminal to the first end portion being less than a height of the step;
   a plurality of cables having cable terminals fixed to the module terminals; and
   a bendable sheet-shaped insulator having a first adhesive portion, a second adhesive portion and a cover portion, the first adhesive portion adhered to an adhesive point located on a back side to a first surface opposite to the printed wiring board of the module body, the second adhesive portion adhered to the first surface, the cover portion continued to the second adhesive portion and covering each of the cable terminals between the first adhesive portion and the second adhesive portion.

2. The electronic apparatus of claim 1,
   wherein the cover portion is tension-applied.
3. The electronic apparatus of claim 1,
   wherein end portions of the cables wired so as to extend in a longitudinal direction of the first end portion on the first end portion is covered by the cover portion.
4. The electronic apparatus of claim 3,
   wherein the insulator has a passage portion shifted in a longitudinal direction of the first end portion to a connection portion between the module terminal and the cable terminal, and
   wherein the cables are passed into the passage portion.
5. The electronic apparatus of claim 4,
   wherein two of the cables are used,
   wherein the passage portion is provided between a connection portion of the cable terminal of one of the cables and the module terminal, to which the cable terminal is fixed, and a connection portion of the cable terminal of the other cable and the module terminal, to which the cable terminal is fixed, and
   wherein the two cables are passed into the passage portion.
6. The electronic apparatus of claim 5,
   wherein the insulator has a separating portion reaching the passage portion, the separating portion separating the second adhesive portion into a first adhesive region and a second adhesive region, and
   wherein the cover portion is separated into the first cover portion and the second cover portion by the passage portion and the separating portion, the first cover region covering the cable terminal of one of the cables and the end portion continued thereto, the second cover region covering the cable terminal of the other cable and the end portion continued thereto.
7. The electronic apparatus of claim 6,
   wherein the separating portion is slit.
8. The electronic apparatus of claim 1,
   wherein the adhesive point is a back surface of the printed wiring board, and
   wherein the insulator arranged over the first surface from the back surface of the printed wiring board, rolling the printed wiring board and the module.
9. The electronic apparatus of claim 8,
   wherein the printed wiring board has an edge portion protruding from the first end portion in a protruding direction of the first end portion, and
   wherein the cover portion protrudes over the edge portion and the first surface.
10. The electronic apparatus of claim 8,
    wherein the printed wiring board has a screw receiving portion, and
    wherein the module is fixed to the printed wiring board with a screw screwed to the screw receiving portion, which is covered by the insulator from a back side of the printed wiring board.
11. The electronic apparatus of claim 1,
    wherein the adhesive point is a second surface of the module body opposite to the first surface, and
    wherein the insulator arranged over from the second surface of the module body to the first surface, rolling the first end portion.
12. The electronic apparatus of claim 1,
    wherein the adhesive point is an inner face of the first housing.

13. The electronic apparatus of claim 1, further comprising a wireless communication device comprising the printed wiring board and the module.

14. The electronic apparatus of claim 1, wherein the module conforms with the NGFF standard.

* * * * *